(12) United States Patent
Furlan et al.

(10) Patent No.: US 7,317,297 B1
(45) Date of Patent: Jan. 8, 2008

(54) BATTERY TEMPERATURE SENSOR PIN USED AS COMMUNICATION CHANNEL

(75) Inventors: Igor Furlan, Sunnyvale, CA (US);
Vladislav Potanin, San Jose, CA (US);
Elena Potanina, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 327 days.

(21) Appl. No.: 10/891,897

(22) Filed: Jul. 15, 2004

(51) Int. Cl.
*H01M 10/44* (2006.01)
*H01M 10/46* (2006.01)

(52) U.S. Cl. .................................... 320/106
(58) Field of Classification Search ............ 320/106, 320/110, 112, 150
See application file for complete search history.

(56) References Cited

U.S. PATENT DOCUMENTS

| | | | | |
|---|---|---|---|---|
| 6,018,228 A | * | 1/2000 | Dias et al. | 320/106 |
| 6,218,806 B1 | * | 4/2001 | Brotto et al. | 320/106 |
| 6,504,341 B2 | * | 1/2003 | Brotto | 320/106 |
| 6,972,542 B2 | * | 12/2005 | Patino et al. | 320/106 |
| 2002/0074973 A1 | * | 6/2002 | Brotto | 320/150 |

* cited by examiner

*Primary Examiner*—Edward H Tso
(74) *Attorney, Agent, or Firm*—Darby & Darby P.C.; Davin Chin

(57) ABSTRACT

A method for communicating with portable device batteries is described. Many portable devices such as cellular phones may employ a wide variety of batteries with different types, capabilities, and the like. Batteries may be retrofitted with additional circuitry that is arranged to provide information about the battery such as capacity, type, charging status, and the like to the portable device. However, additional pins for communication between the battery and the portable device may increase manufacturing cost, reduce reliability, and the like. In addition, many batteries nowadays have a resistor between their ground pin and temperature sense pin that may be used for sensing temperature of the battery as well as providing battery type information to the portable device. The present invention employs a one wire transceiver using the existing temperature sense pin and the resistor, thereby allowing additional information exchange with the battery without increasing manufacturing cost or reducing reliability.

19 Claims, 3 Drawing Sheets

BATTERY TEMPERATURE SENSOR PIN USED AS COMMUNICATION CHANNEL

FIELD OF THE INVENTION

The present invention relates to battery charging, and, in particular, to a method of communicating with a battery employing a temperature sensor pin.

BACKGROUND

Many electronic devices, such as mobile communication devices, are powered by rechargeable batteries. Typically, rechargeable batteries include Lithium-ion and Nickel Cadmium cells. In addition to the cell types, an increasingly wide variety of batteries with different add-on's are available for use with electronic devices. Such add-on's include overcharge protection circuitry, current protection circuitry, battery condition monitor, and the like.

Batteries may be recharged by a separate charging device, by the electronic device employing the battery, and the like. Thus, the electronic device employing a battery may interact with the battery beyond a simple power connection. A typical example of such interaction is temperature sensor pin on commonly available rechargeable batteries. The electronic device employing the battery may detect a temperature of the battery through this pin and accordingly modify charging current supplied to the battery. Furthermore, electronic devices may also monitor the battery's charge state and control their own operations based on the charge state of the battery.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment or an embodiment combining software and hardware aspects. The following detailed description is, therefore, not to be taken in a limiting sense.

Briefly stated, the present invention is related to a method for communicating with portable device batteries. Many portable devices such as cellular phones may employ a wide variety of batteries with different types, capabilities, and the like. Batteries may be retrofitted with additional circuitry that is arranged to provide information about the battery such as capacity, type, charging status, protection mechanism, and the like, to the portable device. However, exchange of such additional information may necessitate additional pins for communication between the battery and the portable device, which in turn may increase manufacturing cost, reduce reliability, and the like.

In addition, many batteries have a resistor between their ground pin and temperature sense pin that may be used for sensing temperature of the battery. The same resistor may also be employed by the portable device to determine battery type. One aspect of the present invention employs temperature sense pin and the resistor to exchange information with the battery without increasing manufacturing cost or reducing reliability. While the embodiments of the invention are described referring to the example of a rechargeable battery in a portable device, the invention is not so limited. Other embodiments may include virtually any type of battery that is employed by an electronic device.

Figure 1:
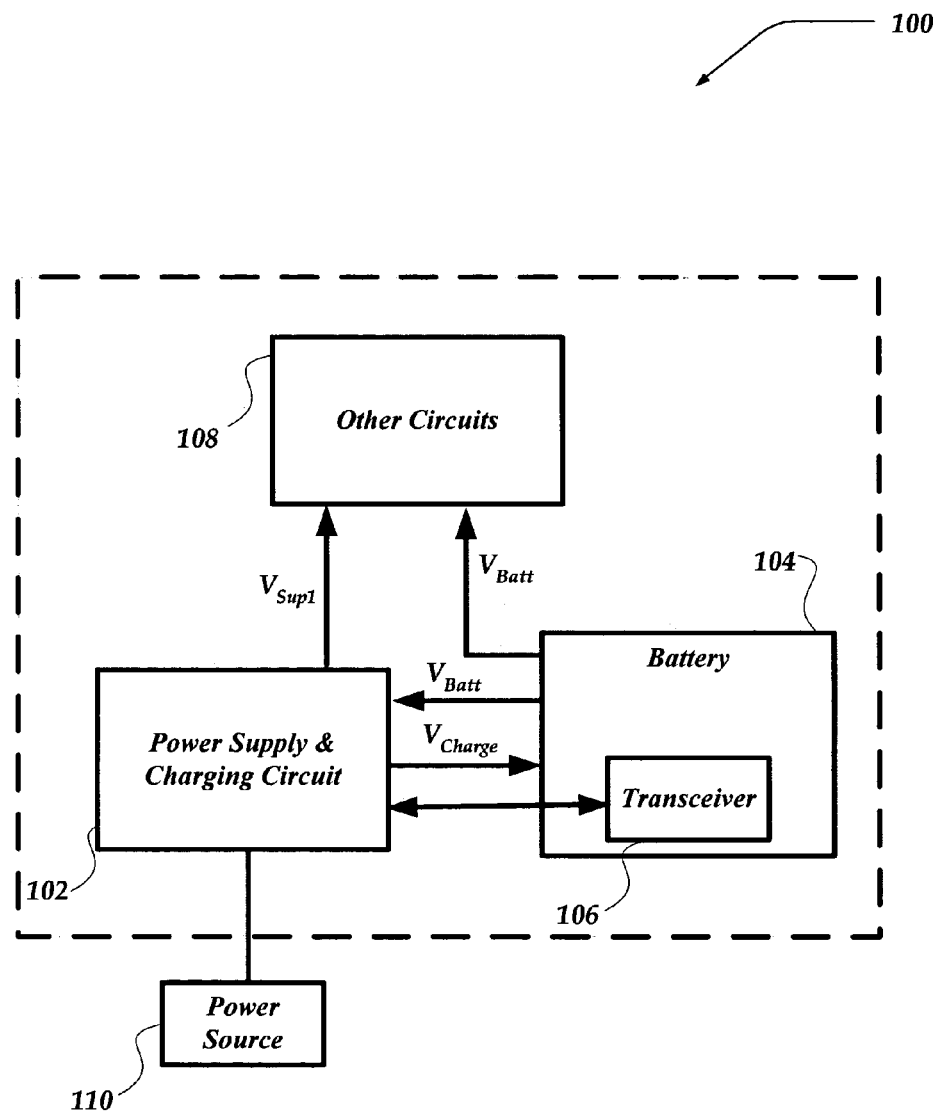
FIG. 1 illustrates a block diagram of a portable device employing an embodiment of the present invention.

FIG. 1 illustrates a block diagram of a portable device 100 employing an embodiment of the present invention. Portable device 100 includes power supply and charging circuit 102, battery 104, and other circuits 108. Battery 104 includes transceiver 106. FIG. 1 also shows power source 110 which is external to portable device 100.

Portable device 100 may be virtually any type of electronic device that is powered by a battery and that can charge the battery utilizing its own circuitry. Such devices include cellular phones, personal digital assistants, laptop computers, data collection devices, and the like. Power source 110 may be virtually any power supply device that can provide operating power to portable device 100. Power source 110 may include an AC/DC adapter, a battery, an AC power source, and the like.

Power supply and charging circuit 102 is arranged to receive regulated or unregulated power from power source 110 and provide regulated voltage $V_{Supl}$ to various circuits of portable device 100. Power supply and charging circuit 102 is further arranged to provide charging voltage $V_{Charge}$ to battery 104. As part of its charging function, power supply and charging circuit 102 may exchange information with battery 104 to determine a type, a capacity, a status, and the like, of battery 104. Power supply and charging circuit 102 may set a value of charging current, a length of charging time, a value of charging voltage, and the like based, in part, on the information received from battery 104. In one embodiment, power supply and charging circuit 102 may transmit information about its charging capabilities to battery 104, which in turn may set parameters of battery protection circuitry based, in part, on the received information.

Battery 104 may include any type of battery such as Lithium-ion, Nickel Cadmium, Nickel-Metal-Hydride, and the like. Battery 104 may provide battery voltage $V_{Batt}$ to power supply and charging circuit 102 and other circuits 108. In one embodiment, battery 104 may include circuitry that can store, exchange, and receive information related to the battery's operation. Such information may comprise battery temperature, capacity, type, charging status, and the like. The circuitry may be implemented as a chip that is programmed during manufacturing, modified during operation, and the like.

In a further embodiment, battery 104 may include transceiver 106, which may be arranged to communicate with power supply and charging circuit 102. Transceiver 106 may include a transmitter, a receiver, and a transmitter and receiver. Transceiver 106 is described in more detail below, in conjunction with FIG. 2.

Other circuits 108 may represent typical circuits of any portable device. Such circuits may include a central processing unit, a display control circuit, an input/output control circuit, a data storage circuit, a communication circuit, and the like. Other circuits 108 may receive supply voltage directly from battery 104 as $V_{Batt}$, or receive various regulated voltages from power supply and charging circuit 102 ($V_{Supl}$).

While a preferred embodiment of the present invention may be implemented in a portable device, the invention is not so limited. The described system may be employed as part of virtually any battery charging circuit known to those skilled in the art. Furthermore, all or part of the components of the above described circuits may be included in the same chip. Alternatively, one or more of the components may be off-chip.

Figure 2:
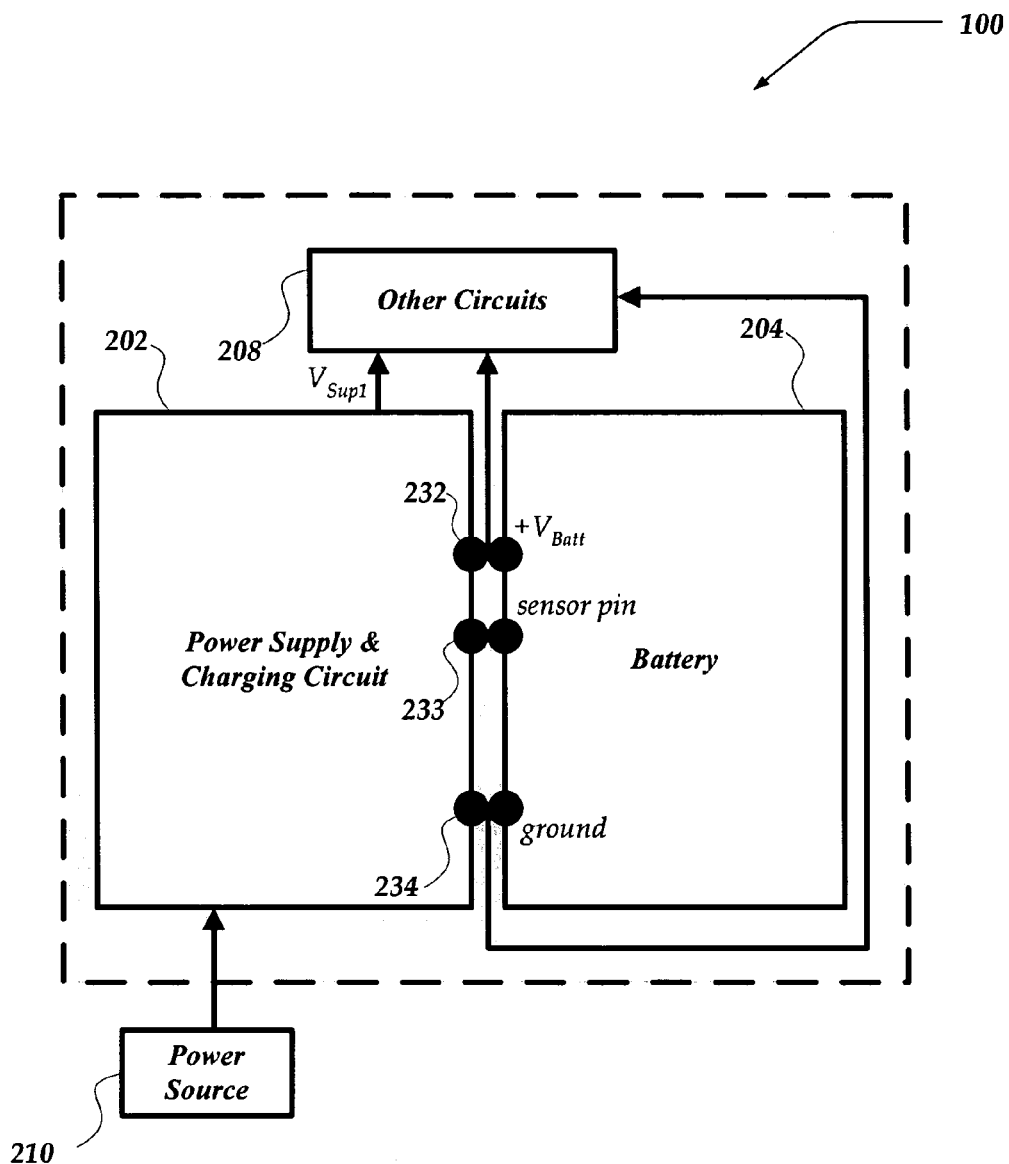
FIG. 2 schematically illustrates an embodiment of the portable device of FIG. 1 showing connections and voltages between different circuits.

FIG. 2 schematically illustrates an embodiment of portable device 100 showing connections and voltages between different circuits. Portable device 100 includes power supply and charging circuit 202, battery 204, and other circuits 208. FIG. 2 also shows power source 210 that is external to portable device 100.

Power supply and charging circuit 202 is coupled to battery 204 through electromechanical contacts 232-234. In one embodiment, electromechanical contact 232 is arranged to provide high battery voltage $V_{Batt}$ to power supply and charging circuit 202, and charging voltage $V_{Charge}$ to battery 204. In another embodiment, $V_{Batt}$ may be provided directly to other circuits 208 via electromechanical contact 232 as well.

Electromechanical contact 233 is arranged to provide temperature sense signal to power supply and charging circuit 202. Electromechanical contact 233 may also be employed for communication between power supply and charging circuit 202 and battery 204. Electromechanical contact 234 is arranged to provide low battery voltage to power supply and charging circuit 202. In one embodiment, the low battery voltage may be a ground signal.

Power supply and charging circuit 202 is arranged to receive power from power source 210 and may provide a plurality of supply voltages $V_{Supl}$ to other circuits based on the power received from power source 210 and/or battery 204.

As described in conjunction with FIG. 1, other circuits 208 may represent typical circuits of any portable device. Such circuits may include a central processing unit, a display control circuit, an input/output control circuit, a data storage circuit, and the like.

Figure 3:
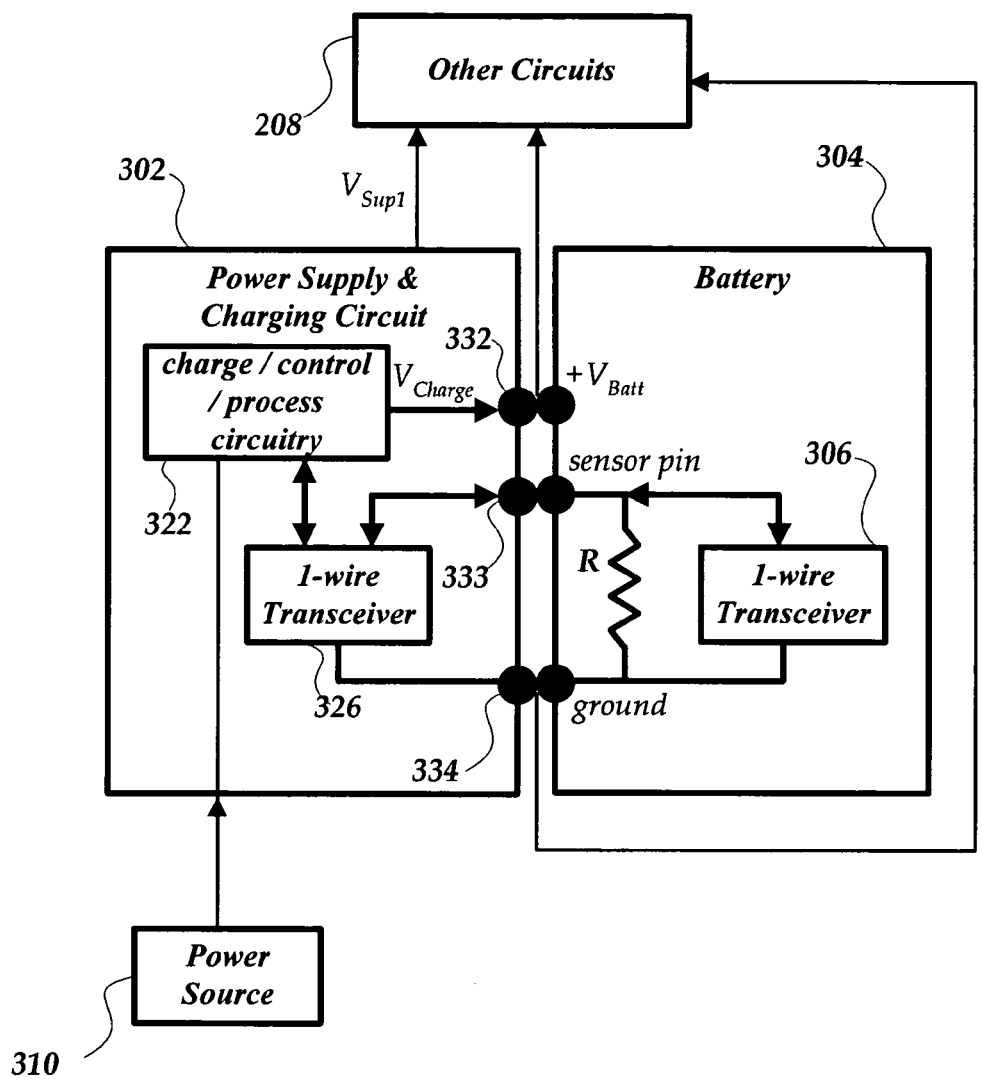
FIG. 3 schematically illustrates an embodiment of a power supply and charging circuit and a battery that may be employed in a portable device such as the portable device of FIG. 2.

FIG. 3 schematically illustrates an embodiment of power supply and charging circuit 302 and battery 304 that may be employed in a portable device such as portable device 100 of FIG. 2.

Power supply and charging circuit 302 is configured to electrically engage power source 310, and to provide regulated power to various circuits of a portable device and charge battery 304. Power supply and charging circuit 302 may include charge/control/process circuitry 322, one wire transceiver 326, and electromechanical contacts 332-334. Charge/control/process circuitry 322 may regulate power received from battery 304 and control charging of battery 304 based, in part, on information received from battery 304 through one wire transceiver 326.

Electromechanical contacts 332-334 are configured to receive battery 304. Electromechanical contacts 332-334 are coupled to corresponding electromechanical contacts on the battery for providing $V_{Charge}$ to battery 304 and $V_{Batt}$ to power supply and charging circuit 302.

Battery 304 includes matching electromechanical contacts that couple to electromechanical contacts 332-334 of power supply and charging circuit 302 for a high battery voltage, a low battery voltage, and a temperature sense signal. Battery 304 may further include temperature sense resistor R and one wire transceiver 306. As mentioned above one-wire transceiver 306 may be arranged to transmit information to power supply and charging circuit 302, to receive information from power supply and charging circuit 302, and to receive and transmit information between the battery and the portable device.

In the transmit only example, battery 304 may include a pre-programmed storage device that stores information about the battery's capacity, protection mechanism, type, and the like. When the battery is connected to the power supply and charging circuit 302 or upon being prompted, transceiver 306 may transmit that information to power supply and charging circuit 302 for processing. Power supply and charging circuit 302 may then determine a battery charging parameter, an operation parameter, and the like based on the received information. For example, power supply and charging circuit 302 may determine stand-by timing of various circuits of a portable device based on a capacity of battery 304.

In the receive only example, battery 304 may include smart protection circuitry that may have adjustable parameters such as current limitation. Upon detecting battery 304, power supply and charging circuit 302 may transmit information about its charging capability, such as maximum charging current, to battery 304 via one-wire transceiver 306. Battery 304 may then adjust its current limitation parameters accordingly to avoid a fault condition, damage to the battery, and the like.

In the transmit and receive example, both the battery and the power supply and charging circuit may transmit and receive information about their respective capabilities and employ the received information in setting their operational parameters.

In one embodiment, one-wire transceiver 306 may employ low voltage swing mode transmission, current mode transmission, and the like. One-wire transceiver 306 may exchange information with a corresponding one-wire transceiver in power supply and charging circuit 302 modifying a voltage across the temperature sense resistor, a current through the temperature sense resistor, and the like.

In another embodiment, one-wire transceiver 306 may be implemented as a Radio Frequency Identification (RFID) chip that is arranged to transmit through the temperature sense pin instead of transmitting wirelessly.

The above specification, examples and data provide a description of the manufacture and use of the composition of the invention. Since many embodiments of the invention can be made without departing from the spirit and scope of the invention, the invention also resides in the claims hereinafter appended.

We claim:

1. A modified battery, comprising:
   a housing that includes:
   a first electromechanical contact associated with a first voltage;
   a second electromechanical contact associated with a second voltage; and
   a third electromechanical contact associated with a temperature sense signal;
   at least one battery cell; and
   a battery transceiver that is arranged to communicate at least one of a type, a capacity, a charge status, or a protection mechanism of the battery with an external charger employing at least one of the first, second, or third electromechanical contacts, wherein the battery is configured to employ at least one of the first, second, or third electromechanical contacts to receive a charging current determined by the external charger, and further determined, in part, by the communications between the battery transceiver and the external charger of the at least one of the type, the capacity, the charge status, or the protection mechanism of the battery.

2. The modified battery of claim 1, further comprising a temperature sensing element that is coupled between the second and the third electromechanical contacts.

3. A modified battery, comprising:
   a housing that includes:
   a first electromechanical contact associated with a first voltage;
   a second electromechanical contact associated with a second voltage; and
   a third electromechanical contact associated with a temperature sense signal;
   at least one battery cell;
   a temperature sensing element that is coupled between the second and the third electromechanical contacts; and
   a battery transceiver that is arranged to communicate with an external transceiver employing at least one of the first, second, or third electromechanical contacts, wherein the battery transceiver is a one-wire transceiver that is coupled in parallel to the temperature sensing element such that at least one of a voltage across the temperature sensing element or a current through the temperature sensing element is modified by the battery transceiver for communication with the external transceiver.

4. The modified battery of claim 3, wherein the battery transceiver is arranged such that a current through the temperature sensing element is modified by the battery transceiver for communication with the external charger.

5. The modified battery of claim 3, wherein the at least one battery cell includes at least one of a Lithium-Ion cell, a Nickel-Cadmium cell, or a Nickel-Metal-Hydride cell.

6. The modified battery of claim 3, further comprising at least one circuit for storing information such that the stored information is transmitted by the battery transceiver to the external charger.

7. The modified battery of claim 6, wherein the information is stored during manufacturing.

8. The modified battery of claim 6, wherein the information is received during operation from the external charger and stored by the at least one circuit.

9. The modified battery of claim 6, wherein the at least one circuit for storing information includes at least one of a ROM, an EEPROM, or a flash memory.

10. A battery-powered electronic device, comprising a power supply and charging circuit that is arranged to provide regulated supply voltage to at least one other circuit in the electronic device, and to provide charging current to the battery based, in part, on information received from the battery, wherein the power supply and charging circuit communicates with the battery utilizing a high voltage contact, a low voltage contact, and a temperature sense contact, wherein the power supply and charging circuit includes a one-wire transceiver that is arranged to communicate with a corresponding battery transceiver in the battery, and wherein the one-wire transceiver communicates with the corresponding battery transceiver employing at least one of a low voltage swing mode transmission or a current mode transmission.

11. The electronic device of claim 10, wherein the information received from the battery includes at least one of a type, a capacity, a charge status, or a protection mechanism of the battery.

12. A battery, comprising:
    a housing that includes:
    a first electromechanical contact associated with a first voltage;
    a second electromechanical contact associated with a second voltage; and
    a third electromechanical contact associated with a temperature sense signal;
    at least one battery cell; and
    a battery transceiver that is arranged to exchange information with an external charger employing at least one of the first, second, or third electromechanical contacts, wherein the information received from the battery includes at least one of a type, a capacity, a charge status, or a protection mechanism of the battery, and wherein the battery is configured to employ at least one of the first, second, or third electromechanical contacts to receive a charging current, determined by the external charger, and further determined, in part, by communications between the battery transceiver and the external charger of the at least one of the type, the capacity, the charge status, or the protection mechanism of the battery.

13. A battery, comprising:
    a housing that includes:
    a first electromechanical contact associated with a first voltage;
    a second electromechanical contact associated with a second voltage; and
    a third electromechanical contact associated with a temperature sense signal;
    at least one battery cell; and
    a battery transceiver that is arranged to exchange information with an external transceiver employing at least one of the first, second, or third electromechanical contacts, wherein the information received from the battery includes at least one of a type, a capacity, a charge status, or a protection mechanism of the battery, and wherein the battery transceiver is arranged to communicate with the external transceiver via the second and third electromechanical contacts employing at least one of a low voltage swing mode transmission or a current mode transmission.

14. A battery-powered electronic device, comprising:
    a means for power control that is arranged to receive power from the battery and to charge the battery;
    a means for coupling the power control means and the battery, wherein the coupling means is arranged to receive a first voltage;

a means for coupling the power control means and the battery, wherein the coupling means is arranged to receive a second voltage;

a means for coupling the power control means and the battery, wherein the coupling means is arranged to receive a third voltage;

a means for communicating information with the battery by employing at least two of the coupling means, wherein the information received from the battery includes at least one of a type, a capacity, a charge status, or a protection mechanism of the battery; and a means for controlling the charging current to the battery based, in part, upon at least one of the type, the capacity, the charge status, or the protection mechanism of the battery.

15. The battery-powered electronic device of claim 14, wherein:

the coupling means that is arranged to receive the first voltage is also arranged to transmit a fourth voltage;

the coupling means that is arranged to receive the second voltage is also arranged to transmit a fifth voltage;

the coupling means that is arranged to receive the third voltage is also arranged to transmit a sixth voltage.

16. A method for exchanging information between an electronic device and a battery, comprising:

detecting a presence of the battery;

communicating with a one-wire transceiver in the battery employing another one-wire transceiver in the electronic device, wherein the one-wire transceivers utilize one of a first pin, a second pin, or a third pin of the battery to communicate with each other, and wherein the first pin is associated with a first voltage, the second pin is associated with a second voltage, and the third pin is associated with a temperature sense signal;

sensing a temperature of the battery, wherein a temperature sensing element is coupled in parallel to the one-wire transceiver; and providing a charging current to the battery based, in part, upon the communicating between the one-wire transceiver in the battery and the one-wire transceiver in the electronic device.

17. The method of claim 16, further comprising:

retrieving information from a storage device on the battery for transmission to the electronic device.

18. The method of claim 17, wherein the information transmitted from the battery includes at least one of a type, a capacity, a charge status, or a protection mechanism of the battery.

19. A method for exchanging information between an electronic device and a battery, comprising:

detecting a presence of the battery; and communicating with a one-wire transceiver in the battery employing another one-wire transceiver in the electronic device, wherein the one-wire transceivers utilize one of a first pin, a second pin, or a third pin of the battery to communicate with each other, wherein the first pin is associated with a first voltage, the second pin is associated with a second voltage, and the third pin is associated with a temperature sense signal, and wherein communicating with the one-wire transceiver in the battery comprises employing at least one of a low voltage swing mode transmission or a current mode transmission.

* * * * *